(12) United States Patent
Cronk

(10) Patent No.: US 10,426,008 B2
(45) Date of Patent: Sep. 24, 2019

(54) AC DIRECT DRIVE SYSTEM FOR LIGHT EMITTING DIODES WITH ULTRA-LOW FLICKER, LOW HARMONIC DISTORTION, DIMMING COMPATIBILITY AND POWER LINE REGULATION

(71) Applicant: Exar Corporation, Fremont, CA (US)

(72) Inventor: Jon Elliott Cronk, Morgan Hill, CA (US)

(73) Assignee: Exar Corporation, Fremont, CA (US)

( * ) Notice: Subject to any disclaimer, the term of this patent is extended or adjusted under 35 U.S.C. 154(b) by 0 days.

(21) Appl. No.: 16/229,877

(22) Filed: Dec. 21, 2018

(65) Prior Publication Data

US 2019/0150241 A1    May 16, 2019

Related U.S. Application Data

(63) Continuation of application No. 15/991,304, filed on May 29, 2018, now Pat. No. 10,201,053.

(60) Provisional application No. 62/511,538, filed on May 26, 2017.

(51) Int. Cl.
H05B 33/08 (2006.01)

(52) U.S. Cl.
CPC ..... *H05B 33/0845* (2013.01); *H05B 33/0812* (2013.01)

(58) Field of Classification Search
CPC ............ H05B 33/0815; H05B 33/0818; H05B 33/0884; H05B 33/0809; H05B 33/0848; H05B 33/0857; H05B 33/0887

USPC ...................... 315/291, 294, 224, 200 R, 193
See application file for complete search history.

(56) References Cited

U.S. PATENT DOCUMENTS

| | | | |
|---|---|---|---|
| 9,084,315 B2 | 7/2015 | Hsu et al. | |
| 9,258,865 B2 | 2/2016 | Hsu et al. | |
| 9,313,839 B2 | 4/2016 | Viviani et al. | |
| 2010/0123403 A1* | 5/2010 | Reed ................... | H05B 33/0815 315/193 |
| 2011/0001436 A1* | 1/2011 | Chemel ................ | H05B 37/029 315/291 |
| 2014/0015440 A1* | 1/2014 | Yu ....................... | H05B 33/0815 315/294 |
| 2014/0253032 A1* | 9/2014 | Bruwer .................... | H02M 1/36 320/108 |
| 2014/0254212 A1* | 9/2014 | Matthews ......... | H02M 3/33523 363/21.15 |
| 2015/0208469 A1* | 7/2015 | Coetzee ................. | H02M 1/36 315/307 |
| 2015/0382417 A1* | 12/2015 | Chou ................. | H05B 33/0815 315/291 |
| 2016/0381744 A1 | 12/2016 | Hsu et al. | |
| 2017/0131611 A1* | 5/2017 | Brown .................... | G02F 1/163 |
| 2017/0202605 A1* | 7/2017 | Shelton, IV ... | A61B 17/320092 |
| 2017/0244318 A1* | 8/2017 | Giuliano ................. | H02M 3/07 |

* cited by examiner

*Primary Examiner* — Douglas W Owens
*Assistant Examiner* — Syed M Kaiser
(74) *Attorney, Agent, or Firm* — McAndrews, Held & Malloy, Ltd.

(57) ABSTRACT

As a non-limiting example, various aspects of this disclosure provide embodiments of AC direct drives for light emitting diodes for a wide variety of drive stages.

20 Claims, 4 Drawing Sheets

AC DIRECT DRIVE SYSTEM FOR LIGHT EMITTING DIODES WITH ULTRA-LOW FLICKER, LOW HARMONIC DISTORTION, DIMMING COMPATIBILITY AND POWER LINE REGULATION

CROSS-REFERENCE TO RELATED APPLICATIONS/INCORPORATION BY REFERENCE

The present application is a continuation of U.S. application Ser. No. 15/991,304 titled "AC DIRECT DRIVE SYSTEM FOR LIGHT EMITTING DIODES WITH ULTRA-LOW FLICKER, LOW HARMONIC DISTORTION, DIMMING COMPATIBILITY AND POWER LINE REGULATION" and filed on May 29, 2018, which in turn claims priority to and claims benefit from U.S. Provisional Patent Application Serial No. 62/511,538, filed on May 26, 2017. The contents of each of the above applications are hereby incorporated herein by reference in their entirety.

BACKGROUND

Certain embodiments of the disclosure relate to light equipment and more specifically to an AC direct drive system for light emitting diodes with ultra-low flicker, low harmonic distortion, dimming compatibility, and power line regulation.

Limitations and disadvantages of conventional and traditional approaches, and improved performance over conventional and traditional approaches will become apparent to one of skill in the art through comparison of such systems with some aspects of the present disclosure as set forth in the remainder of the present application with reference to the drawings.

SUMMARY

The present disclosure discloses an AC direct drive system for light emitting diodes with ultra-low flicker, low harmonic distortion, dimming compatibility, and power line regulation, substantially as shown in and/or described below, for example in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
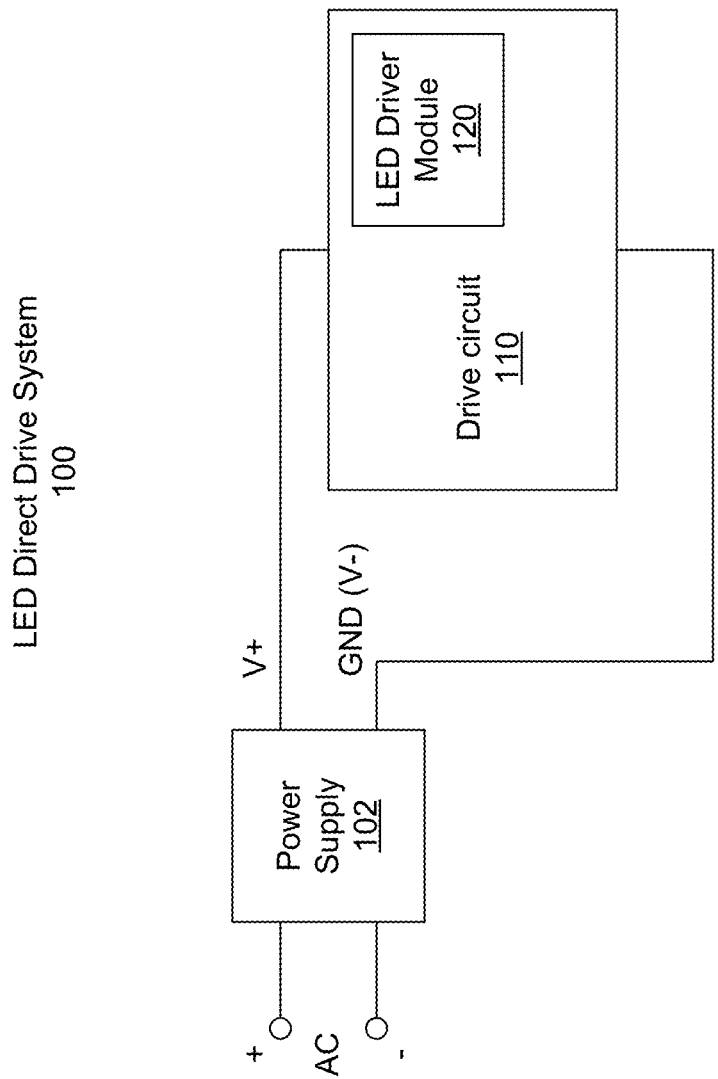
FIG. 1 illustrates a high level block diagram of an example AC direct drive system, in accordance with an embodiment of the disclosure.

Various example embodiments of the disclosure will be described in detail with reference to the accompanying drawings such that they can be made and used by those skilled in the art.

Various aspects of the present disclosure may be embodied in many different forms and should not be construed as being limited to the example embodiments set forth herein. Rather, these example embodiments of the disclosure are provided so that this disclosure will be thorough and complete and will convey various aspects of the disclosure to those skilled in the art.

The terminology used here is for the purpose of describing particular embodiments only and is not intended to limit the disclosure. In the drawings, the thickness, width, length, size, etc., of layers, areas, regions, components, elements, etc., may be exaggerated for clarity. Like reference numerals refer to like elements throughout.

As utilized herein, "and/or" means any one or more of the items in the list joined by "and/or." As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y, and/or z" means "one or more of x, y, and z." As utilized herein, the term "exemplary" means serving as a non-limiting example, instance, or illustration. As utilized herein, the terms "e.g." and "for example" set off lists of one or more non-limiting examples, instances, or illustrations.

Also, the singular forms are intended to include the plural forms as well, unless the context clearly indicates otherwise. It will be further understood that the terms "comprises," "comprising," "includes," and/or "including," when used in this specification, specify the presence of stated features, numbers, steps, operations, elements, and/or components, but do not preclude the presence or addition of one or more other features, numbers, steps, operations, elements, components, and/or groups thereof.

In addition, it will be understood that when an element A is referred to as being "connected to" or "coupled to" an element B, the element A can be directly connected to or coupled to the element B, or an intervening element C may be present between the elements A and B so that the element A can be indirectly connected to or coupled to the element B.

Furthermore, although the terms first, second, etc., may be used to describe various members, elements, regions, layers and/or sections, these members, elements, regions, layers and/or sections should not be limited by these terms. These terms are only used to distinguish one member, element, region, layer, and/or section from another. Thus, for example, a first member, a first element, a first region, a first layer, and/or a first section discussed below could be termed a second member, a second element, a second region, a second layer, and/or a second section without departing from the teachings of the present disclosure.

Spatially relative terms, such as "upper," "lower," "side," and the like, may be used for ease of description to describe the relationship of one element or feature to another element(s) or feature(s) as illustrated in the figures. It will be understood that the spatially relative terms are intended to encompass different orientations of the device in use or operation in addition to the orientation depicted in the figures. For example, if the device in the figures is turned upside-down, elements described as "below" or "beneath"

other elements or features would then be oriented "above" the other elements or features. Thus, the exemplary term "below" can encompass both an orientation of above and below.

Alternating current (AC) drives for LEDs in general may have been designed to provide good power factor (PF) and total harmonic distortion (THD), but they have not accomplished this with flicker lower than, for example, 20% while maintaining triac dimming performance and power line regulation. On the other hand, AC drives meeting PF and THD requirements fall short of complete uniformity in light, because the LED current may not be controlled uniformly.

This disclosure provides an AC direct drive solution, which, while allowing for ultra-low flicker (for example, <5%), may still provide excellent triac dimming performance and power line regulation. Maintaining triac dimming performance and power line regulation, while keeping flicker very low may be accomplished, for example, through communication from a chip monitoring the input voltage to another chip driving the LEDs.

This disclosure may also provide an amp second balance function through chip to chip communication to allow for reduction in the required capacitance for low ripple performance. By providing information from the device regulating the LED current to the device regulating the charge current of the capacitor an amp second balance may be achieved such that the capacitor may meet the needs of the LED driver to maintain low ripple.

The disclosure may further provide for the improvement in the light uniformity provided by better control of current when used in multiple drive stages, overcoming the uniformity shortfall of AC direct drives meeting PF and THD requirements. By providing communication between the individual drivers with the proposed scheme light uniformity may be optimized for a wider range of drive stages.

For example, an LED driver may send line voltage information to another device, the LED driver may receive line voltage information from yet another device, and a constant current may be regulated in the LEDs based on the received line voltage information and sent information to the other device responsible for maintaining an amp second balance on a capacitor.

The various devices comprise circuitry, and the circuitry may be in discrete integrated circuits ("chips"). Accordingly, while the various circuitry may be described as being in separate devices (or chips), various embodiments of the disclosure need not be so restricted. The circuitry may be configured to be in one or more devices (or chips) as appropriate.

Embodiments of the present disclosure will now be described with reference to the drawings, which are provided as illustrative examples of the disclosure so as to enable those skilled in the art to practice the disclosure. Notably, the figures and examples below are not meant to limit the scope of the present disclosure to a single embodiment, but other embodiments are possible by way of interchange of some or all of the described or illustrated elements.

Moreover, where certain elements of the present disclosure can be partially or fully implemented using known components, only those portions of such known components that are necessary for an understanding of the present disclosure will be described, and detailed descriptions of other portions of such known components will be omitted so as not to obscure the disclosure.

In the present specification, an embodiment showing a singular component should not be considered limiting; rather, the disclosure is intended to encompass other embodiments including a plurality of the same component or nested stages, and vice-versa, unless explicitly stated otherwise herein. Moreover, applicants do not intend for any term in the specification or claims to be ascribed an uncommon or special meaning unless explicitly set forth as such. Furthermore, the present disclosure encompasses present and future known equivalents to the known components referred to herein by way of illustration.

FIG. 1 illustrates a high level block diagram of an example AC direct drive system, in accordance with an embodiment of the disclosure. Referring to FIG. 1, there is shown an LED direct drive system 100 comprising a power supply 102 and a drive circuit 110.

Figure 3:
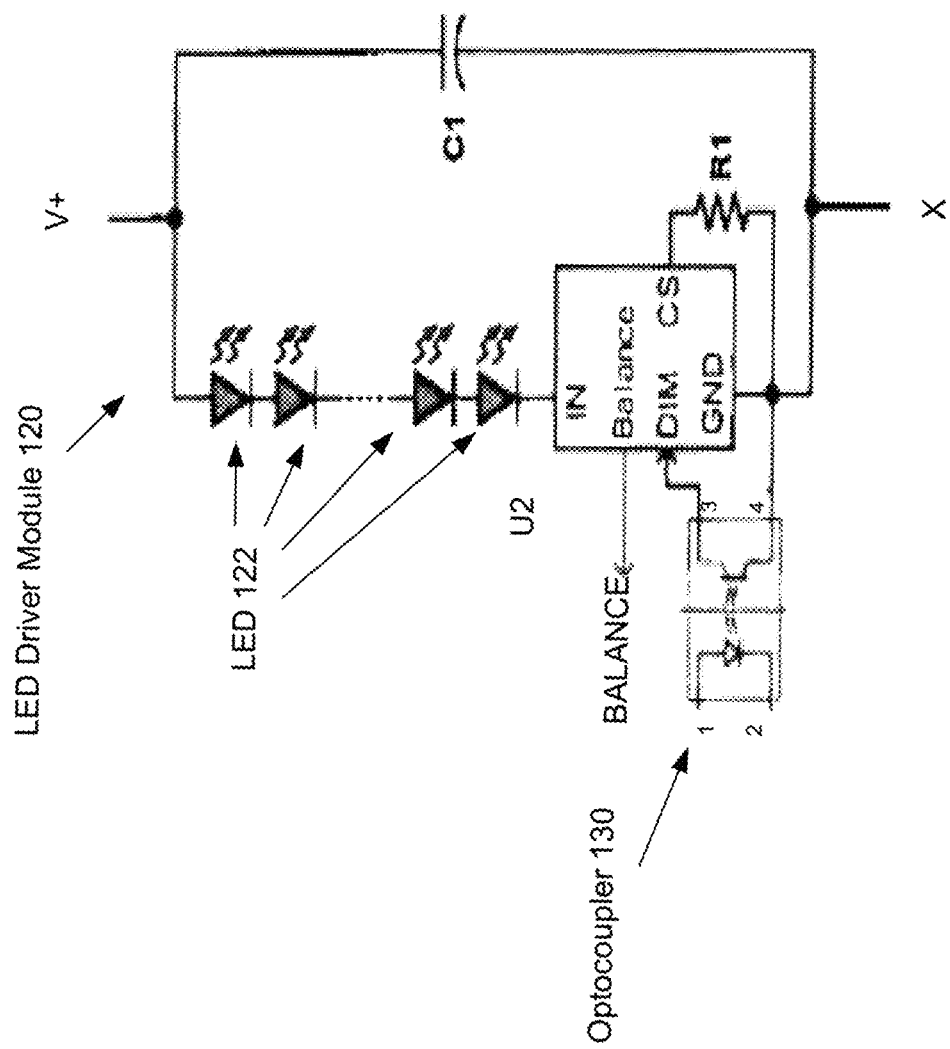
FIG. 3 illustrates an LED driver module comprising a series of LEDs with the current sink having the capability to receive information to reduce current from the current source U1, according to an embodiment of the present disclosure.

The power supply 102 may be, for example, a bridge rectifier that accepts AC line voltage and rectifies the AC voltage to provide positive rectified input voltage V+, and a corresponding input current I+, and a ground (GND) voltage V−. The drive circuit 110 may comprise an LED driver module 120 that comprises LEDs 122 (FIG. 3). The LED driver module 120 may be coupled to a node to receive voltage V+ and to a node X serving as ground. The drive circuit 110 may be electrically coupled to V+ and GND such that current may be provided to the LEDs 122 (FIG. 3).

Line voltage information may be communicated from a first current controller (or a current controlling device) U1 (FIG. 2) to a second current controller U2 (FIG. 3), where the second current controller U2 may regulate constant current for the LEDs 122 that provide light. Further information based on the line voltage information may be sent by, for example, the second current controller U2 to one or more third current controllers U3 responsible for maintaining a voltage on one or more capacitors C1 (FIG. 3).

Figure 2:
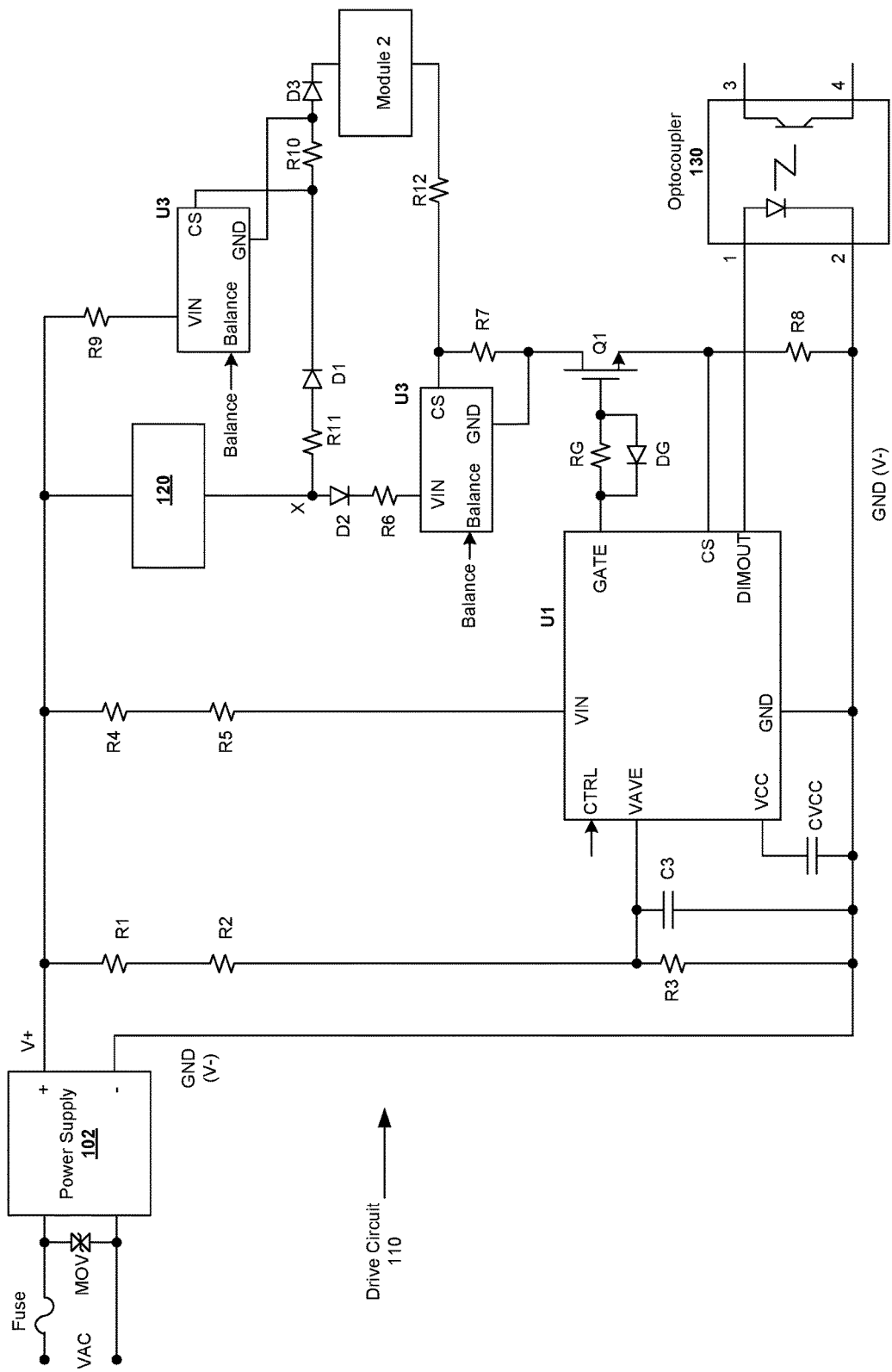
FIG. 2 illustrates an example circuit diagram for achieving power line regulation, light uniformity, and low flicker, according to an embodiment of the present disclosure.

FIG. 2 illustrates an example circuit diagram achieving power line regulation, light uniformity, and low flicker, according to an embodiment of the present disclosure. Referring to FIG. 2, there is generally shown the power supply 102 and a drive circuit 110, and the LED driver module 120. The LED driver module 120 may be electrically coupled to pins 3 and 4 of the optocoupler 104 shown in FIG. 2. Persons skilled in the art will readily appreciate that FIG. 2 illustrates just one possible implementation, and various other implementations may be made without deviating from the disclosure, including implementations having multiple stages. Some of the operation of the circuitry shown in FIG. 2 may not be explained in detail as those skilled in the art can determine those operations using the information disclosed with respect to the various figures and claims.

In an implementation, the current controller U1, which may be a current source, may provide a control signal DIMOUT that is communicated to a current controller U2 (FIG. 3) in the LED driver module 120. The control signal DIMOUT may be used to, for example, vary the current through the LED driver module 120. The current controller U1 may monitor, for example, an average input voltage at the input VAVE. The average input voltage may be determined by the components R1, R2, R3, and C3.

As the average input voltage at the input VAVE increases from a nominal value, the control signal DIMOUT may be adjusted to allow current from the power supply 102 to be reduced to maintain a constant input power. The control signal DIMOUT may be communicated to current controller U2 in the LED driver module 120 by the optocoupler 130.

The current controller U2 may output an appropriate signal BALANCE to the current controller(s) U3. The current controller(s) U3, which may regulate current, may then reduce current through the current controller(s) U3.

Accordingly, power line regulation may be achieved since the reduced input current in response to increase in the average input voltage may result in a substantially constant input power from the power supply 102, where the input power comprises the input voltage and the input current. In some embodiments, the current controller U2 may be able to control the input current without communicating to the current controller U3.

In some embodiments, there may be no change in the control signal DIMOUT for a certain input voltage band. However as the voltage falls below this voltage band, the voltage across the current controller U2 (FIG. 3) may start to fall and the LED driver module 120 may request more current from current controller(s) U3 through the signal BALANCE. If the current controller(s) U3 is unable to provide the required current, then the current controller U2 may start to fall out of compliance and a significant increase in flicker may occur. Accordingly, various implementations may be designed to ensure compliance across a negative 10% range from nominal.

Additionally, the current controller U1 may monitor a voltage at the input VIN of the current controller U1, and as VIN begins to fall, as may be the case with, for example, triac dimming, the current controller U1 may signal to the current controller U2 to reduce current demand via the control signal DIMOUT. As a result, the onset of flicker may be delayed significantly due to reduced current demands and due to the operation of the "full balanced" architecture's ability to operate at lower input voltages. In a "full balanced" architecture, all LEDs may be provided with relatively the same current.

Accordingly, communication between the different modules, such as, for example, between current controllers U1 and U2 may allow central control of the input power required, and the maintenance of an amp second balance by the communication between the current controllers U2 and U3 may ensure that low flicker is maintained over a wide range of input voltages and provide excellent dimming performance. As can be seen, this result may be achieved without compromising PF or THD performance.

FIG. 3 illustrates an LED driver module comprising a series of LEDs with the current sink having the capability to receive information to reduce current from a current source, according to an embodiment of the present disclosure. Referring to FIG. 3, there is shown the LED driver module 120 comprising a string of LEDs 122 in series with a current controller U2, which may be a current sink, and a capacitor C1 in parallel with the LEDs 122 and the current controller U2. The current controller U2 may be connected to the input voltage V+ via a power node and to a device ground node X via a ground node, and may be configured to regulate current via a signal DIMOUT (FIG. 2) from the module U1. The signal DIMOUT may be received as an input by an optocoupler 130, and the optocoupler 130 may output a signal to the DIM input of the module U2. Although various implementations may use an optocoupler 104 to communicate the DIMOUT signal from the module U1 to the module U2, as shown in FIGS. 2 and 3, other communication schemes may be used in other implementations of the disclosure.

The current controller U2 may also have an output that is a function of the voltage $V_{U2}$ of the current controller U2 between its power and ground nodes. As voltage $V_{U2}$ falls to the point where the current controller U2 may no longer be able to regulate current, a request for more current may be sent to current controller U3 (FIG. 2) via the signal BALANCE, where the current controller(s) U3 may be used to control the total current through the LED module 120 where the LEDs 122 are in parallel with the capacitor C1. Various embodiments may have a plurality of current controller(s) U3.

Accordingly, it may be seen that the communication between current controllers U1 and U2 may allow control of the input power required and the maintenance of an amp second balance by the communication between the current controllers U2 and U3 may ensure that a low flicker is maintained.

Figure 4:
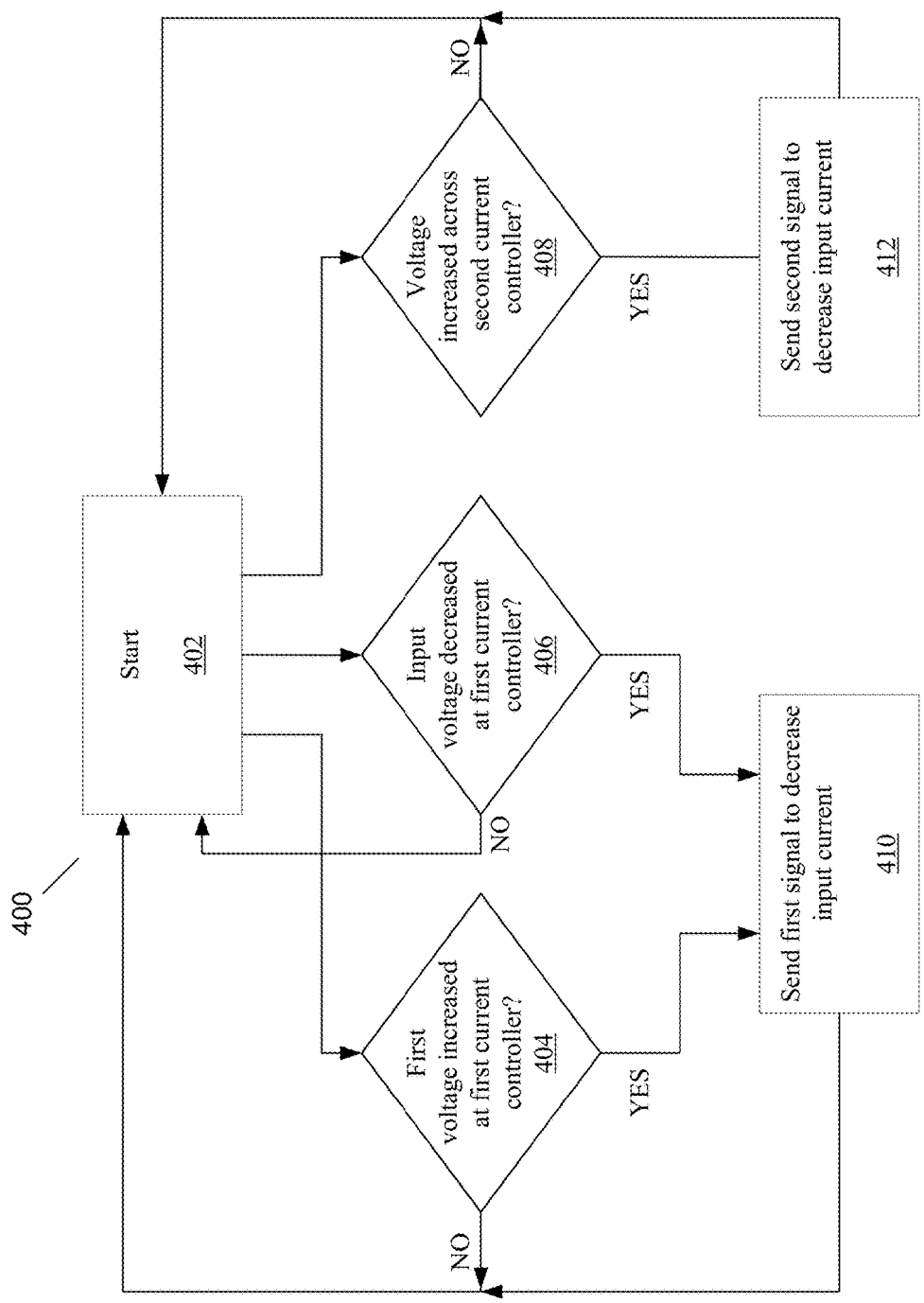
FIG. 4 is a flow diagram of an example of an AC direct drive system in use, in accordance with an embodiment of the disclosure.

FIG. 4 is a flow diagram of an example of an AC direct drive system in use, in accordance with an embodiment of the disclosure. Referring to FIG. 4, there is shown a flow diagram 400 comprising blocks 402 to 412.

The flow diagram starts with block 402, where the flow diagram is in a start mode. This may be, for example, when the AC direct drive system 100 is put in use, for example, by turning on an LED light. Several determinations may be made in parallel.

A first determination may be made in block 404 whether the first voltage, which may be an average of the input voltage, at a first input of the first current controller U1 is increasing. The first input may be the input VAVE. If so, then the next step may be to block 410. Otherwise, the next step may be back to block 402.

A second determination may be made at block 406 whether the input voltage at a second input of the first current controller U1, which may be the input VIN, is decreasing. This may occur, for example, when a light is being dimmed such that the input voltage from the power supply 102 is decreasing. If so, then the next step may be to block 410. Otherwise, the next step may be back to block 402.

A third determination may be made at block 408 whether the voltage across the power node and the ground node of the second current controller U2 has decreased to a point where the second current controller U2 is not able to regulate current. If so, then the next step may be to block 412. Otherwise, the next step may be back to block 402.

At block 410, a first signal may be sent from the first current controller U1 to the second current controller U2 to decrease the input current from the power supply 102. This may be via, for example, the optocoupler 130. The next step may be to block 402.

At block 412, a second signal may be sent by the second current controller U2 to the third current controller U3 to increase current through the third current controller U3. The next step may be to block 402.

Although there may be many different ways to signal from one device to another, a method may be to use the amplitude of the signal to correlate to the level of a current. Another method may be to modulate a signal to provide the current level. Still another method may be to use digital bits to encode the amount of current. Accordingly, it can be seen that a person of ordinary skill in the arts may use any of a number of different methods to control current decrease/increase.

While the determinations are shown as being made in parallel, various embodiments need not be so limited. The determinations may be made serially, for example.

Although the present disclosure has been described with reference to the preferred embodiments thereof, it should be readily apparent to those of ordinary skill in the art that changes and modifications in the form and details may be made without departing from the spirit and scope of the disclosure.

As presented, an example embodiment of the disclosure may be a light emitting diode (LED) direct drive system 100 comprising a power supply configured to convert alternating current (AC) power to input power comprising input voltage and input current. A first current controlling device U1 may be configured to provide first communication to a second current controlling device U2, and there may be a third current controlling device U3, where the second current controlling device U2 is configured to provide a second communication to the third current controlling device U3. The first current controlling device U1 may be configured to communicate to the second current controlling device U2 to decrease current, when voltage at a first input (VAVE) of the first current controlling device U1 increases. This may allow the input power to be regulated. The first current controlling device U1 may be configured to communicate to the second current controlling device U2 to decrease current when the input voltage at a second input (VIN) of the first current controlling device U1 decreases. The second current controlling device U2, comprising a power node and a ground node, may be configured to communicate to the third current controlling device U3 to increase current through the third current controlling device U3 when a voltage across the power node and the ground node decreases to a level where the second current controlling device U2 is not able to regulate current.

The power supply 102 may comprise, for example, a bridge rectifier that may be configured to output a positive, rectified voltage and current. An optocoupler 130 may be used to transmit a signal to the second current controlling device U2 based on the communication received from the first current controlling device U1.

The second current controlling device U2 may be in series with one or more LEDs 122, and the second current controlling device U2 and the one or more LEDs 122 may be in parallel with a first capacitor C1. The LEDs 122 may be in a full-balanced architecture.

The second current controlling device U2 may be configured to communicate to the third current controlling device U3 to have the third current controlling device U3 change the input current by increasing or decreasing the input current.

A voltage divider, formed by resistors R1-R3 and a capacitor C3, may be configured to provide an average input voltage as the voltage at the first input VIN of the first current controlling device U1.

Another example embodiment of the disclosure may be a method for operating a light emitting diode (LED) direct drive system 100, comprising converting alternating current (AC) power with, for example, a power supply 102 that comprises a bridge rectifier to input power that may comprise positive, rectified input voltage and input current. A first signal may be communicated from a first current controlling device U1 to a second current controlling device U2 to decrease input current from the power supply 102 to regulate input power when voltage at a first input VAVE of the first current controlling device U1 increases.

Communicating, using the first signal from the first current controlling device U1, with the second current controlling device U2 to decrease the input current may take place when there is a decrease in the input voltage at a second input VIN of the first current controlling device U1. The second current controlling device U2, which may comprise a power node and a ground node, may communicate a second signal to a third current controlling device U3 to increase current through the third current controlling device U3. This may occur when a voltage across the power node and the ground node of the second current controlling device U2 decreases to a level where the second current controlling device U2 may not be able to regulate current.

The first signal may be received by an optocoupler, which may then transmit a third signal to the second current controlling device U2 based on the first signal received from the first current controlling device U1. The second current controlling device U2 may be in series with one or more LEDs 122, and the second current controlling device U2 and the one or more LEDs 122 may be in parallel with a first capacitor C1. The LEDs 122 may be configured in a full-balanced architecture.

Upon receiving the first signal by a second current controlling device U2, the second current controlling device U2 may transmit to the third current controlling device U3 the second signal to have the third current controlling device U3 change the input current. The change may be to decrease or increase the input current from the power supply 102, depending on the second signal sent.

The voltage formed at the first input may be an average input voltage from the input voltage using a voltage divider formed of resistors R1-R3 and a capacitor C1.

The flicker of the LED direct drive system in operation may be less than 5%.

Another example embodiment of the disclosure may be a light emitting diode (LED) direct drive system 100, comprising a power supply 102 comprising a bridge rectifier configured to convert alternating current (AC) power to input power comprising input voltage and input current. A first current controlling device U1 may be configured to provide first communication, via an optocoupler, to a second current controlling device U2 to change the input current. A third current controlling device U3, where the second current controlling device U2 may be configured to provide second communication to the third current controlling device U3 to change the input current, where changing the input current may provides one or more of input power regulation and low flicker.

The second current controlling device U2 may be in series with one or more LEDs 122, and the second current controlling device U2 and the one or more LEDs 122 may be in parallel with a first capacitor C1. The one or more LEDs 122 may be in a full-balanced architecture.

These and other aspects, advantages, and novel features of the present embodiments, as well as details of an illustrated example embodiment thereof, will be more fully understood from the following description and drawings.

While various embodiments of the disclosure have been described above, it should be understood that they have been presented as non-limiting examples only. While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What are claimed:

1. A light emitting diode (LED) direct drive system, comprising:
    a power supply configured to convert alternating current (AC) power to input power comprising input voltage and input current; and
    a drive circuit comprising:
        a first current controlling device;
        an LED driver module that comprises one or more LEDs and a second current controlling device; and an optocoupler, wherein the first current controlling device is configured to communicate a first signal to the second current controlling device via the optocoupler, and wherein the power supply is configured to provide the input voltage and the input current to the drive circuit.

2. The LED direct drive system of claim 1, wherein the drive circuit comprises a third current controlling device, and the second current controlling device is configured to communicate a second signal to the third current controlling device.

3. The LED direct drive system of claim 2, wherein the third current controlling device is configured to use the second signal to regulate current.

4. The LED direct drive system of claim 2, wherein the third current controlling device is configured to use the second signal to change the input current.

5. The LED direct drive system of claim 2, wherein, when the input voltage is less than a threshold voltage, the second current controlling device is configured to communicate the second signal to request additional current.

6. The LED direct drive system of claim 1, comprising a voltage divider, formed by resistors and at least one capacitor, configured to provide an average input voltage as the voltage at the first input.

7. The LED direct drive system of claim 1, wherein the second current controlling device is in series with one or more LEDs, and the second current controlling device and the one or more LEDs are in parallel with a first capacitor.

8. The LED direct drive system of claim 1, wherein the second current controlling device is configured to use the first signal to regulate current through the one or more LEDs and the second current controlling device.

9. The LED direct drive system of claim 1, wherein the power supply comprises a bridge rectifier.

10. The LED direct drive system of claim 9, wherein the input voltage is a positive, rectified voltage and the input current is a positive, rectified current.

11. A method for operating a light emitting diode (LED) direct drive system, comprising:
converting alternating current (AC) power, by a power supply, to input power comprising input voltage and input current;
determining whether a first voltage at a first input of a first current controlling device is increasing;
determining whether a second voltage at a second input of the first current controlling device is decreasing; and
communicating, upon determining that one or both of the first voltage is increasing or the second voltage is decreasing, a first signal from the first current controlling device to a second current controlling device to decrease the input current from the power supply.

12. The method of claim 11, comprising:
determining whether a third voltage across a power node and a ground node of a second current controlling device is below a threshold voltage; and
communicating, upon determining that the third voltage is below the threshold voltage, a second signal by the second current controlling device to a third current controlling device to increase current through the third current controlling device.

13. The method of claim 12, comprising determining when the LED direct drive system is in providing LED power to one or more LEDs prior to determining one or more of whether the first voltage is increasing, whether the second voltage is decreasing, or whether the third voltage is below the threshold voltage.

14. The method of claim 11, wherein the first voltage is an average of the input voltage.

15. The method of claim 11, wherein the first signal is communicated to the second current controlling device via an optocoupler.

16. The method of claim 11, wherein:
the second current controlling device is in series with one or more LEDs; and
the second current controlling device and the one or more LEDs are in series with a first capacitor.

17. The method of claim 16, wherein the second current controlling device is configured to use the first signal to regulate current through the one or more LEDs and the second current controlling device.

18. A light emitting diode (LED) direct drive system, comprising:
a power supply configured to convert alternating current (AC) power to input power comprising input voltage and input current; and
a first current controlling device; and
a second current controlling device,
wherein the first current controlling device is configured to:
determine one or both of whether a first voltage at a first input of the first current controlling device is increasing or whether a second voltage at a second input of the first current controlling device is decreasing; and
communicate, upon determining that one or both of the first voltage is increasing or the second voltage is decreasing, a first signal from the first current controlling device to the second current controlling device to decrease the input current from the power supply.

19. The LED direct drive system of claim 18, comprising a third current controlling device, wherein the second current controlling device is configured to:
determine whether a third voltage across a power node and a ground node of a second current controlling device is below a threshold voltage; and
communicate, upon determining that the third voltage is below the threshold voltage, a second signal to a third current controlling device to increase current through the third current controlling device.

20. The LED direct drive system of claim 18, comprising an optocoupler configured to communicate the first signal to the second current controlling device.

* * * * *